US012341612B2

(12) United States Patent
Yin

(10) Patent No.: US 12,341,612 B2
(45) Date of Patent: Jun. 24, 2025

(54) PRIORITY DIFFERENTIATION OF SR TRANSMISSIONS WITH HARQ-ACK CODEBOOKS OF DIFFERENT SERVICE TYPES

(71) Applicant: SHARP KABUSHIKI KAISHA, Sakai (JP)

(72) Inventor: Zhanping Yin, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 643 days.

(21) Appl. No.: 17/628,541

(22) PCT Filed: Jul. 22, 2020

(86) PCT No.: PCT/JP2020/028573
§ 371 (c)(1),
(2) Date: Jan. 19, 2022

(87) PCT Pub. No.: WO2021/015275
PCT Pub. Date: Jan. 28, 2021

(65) Prior Publication Data
US 2022/0255669 A1  Aug. 11, 2022

Related U.S. Application Data

(60) Provisional application No. 62/878,175, filed on Jul. 24, 2019.

(51) Int. Cl.
*H04L 1/1607* (2023.01)
*H04L 1/1812* (2023.01)
(Continued)

(52) U.S. Cl.
CPC .......... *H04L 1/1671* (2013.01); *H04L 1/1812* (2013.01); *H04W 72/21* (2023.01); *H04W 72/569* (2023.01)

(58) Field of Classification Search
CPC ... H04L 1/1671; H04L 1/1812; H04L 1/1854; H04L 5/0055; H04L 1/1607; H04W 72/21; H04W 72/569; H04W 72/1268
See application file for complete search history.

(56) References Cited

U.S. PATENT DOCUMENTS

2015/0200752 A1\* 7/2015 Yin .................. H04W 72/0446
370/280
2018/0295540 A1\* 10/2018 Akkarakaran ........ H04W 72/23
(Continued)

OTHER PUBLICATIONS

3GPP TS 38.213 V15.6.0 (Jun. 2019) 3rd Generation Partnership Project; Technical Specification Group Radio Access Network; NR; Physical layer procedures for control (Release 15).
(Continued)

*Primary Examiner* — Chuong M Nguyen
(74) *Attorney, Agent, or Firm* — ScienBiziP, P.C.

(57) ABSTRACT

A UE is configured to transmit PUCCHs for respective SRs with SR transmission occasions that would overlap with a transmission of a PUCCH with subslot based HARQ-ACK information in a resource using PUCCH format 2, 3, or 4 in a subslot of a slot. The UE includes processing circuitry configured to append SR information bits to subslot based HARQ-ACK information bits using PUCCH format 2, 3, or 4. The UE includes transmitting circuitry configured to transmit UCI bits, having the HARQ-ACK and SR information bits, in a PUCCH using the PUCCH resource for the subslot based HARQ-ACK information bits with PUCCH format 2, 3, or 4. A number of the SR information bits is based on a total number of SRs with all priority configurations, or SRs with high priority configurations, whose PUCCH resources overlap with the subslot based HARQ-ACK PUCCH resource in the subslot of the slot.

3 Claims, 5 Drawing Sheets

(51) Int. Cl.
*H04W 72/21* (2023.01)
*H04W 72/566* (2023.01)

(56) References Cited

U.S. PATENT DOCUMENTS

2018/0324787 A1* 11/2018 Yin ........................ H04L 5/0053
2019/0246416 A1* 8/2019 Park ...................... H04W 72/21

OTHER PUBLICATIONS

Samsung, "Corrections on PUCCH for up to 2 Symbols", R1-1806733 3GPP TSG RAN WG1 #93, Busan, Korea, May 21-25, 2018.
Institute for Information Industry (III), "Remaining Issues on overlapping of HARQ-ACK and SR", R1-1805131, 3GPP TSG RAN WG1 Meeting #92bis, Sanya, China, Apr. 16-20, 2018, Apr. 7, 2018.

* cited by examiner

FIG. 1

```
-- ASN1START
-- TAG-SCHEDULING-REQUEST-RESOURCE-CONFIG-START

SchedulingRequestResourceConfig ::=    SEQUENCE {
    schedulingRequestResourceId            SchedulingRequestResourceId,
    schedulingRequestID                    SchedulingRequestId,
    periodicityAndOffset                   CHOICE {
        sym2                                   NULL,
        sym6or7                                NULL,
        sl1                                    NULL,           -- Recurs in every slot
        sl2                                    INTEGER (0..1),
        sl4                                    INTEGER (0..3),
        sl5                                    INTEGER (0..4),
        sl8                                    INTEGER (0..7),
        sl10                                   INTEGER (0..9),
        sl16                                   INTEGER (0..15),
        sl20                                   INTEGER (0..19),
        sl40                                   INTEGER (0..39),
        sl80                                   INTEGER (0..79),
        sl160                                  INTEGER (0..159),
        sl320                                  INTEGER (0..319),
        sl640                                  INTEGER (0..639)
    }
OPTIONAL,    -- Need M
    resource                               PUCCH-ResourceId
OPTIONAL     -- Need M
}

-- TAG-SCHEDULING-REQUEST-RESOURCE-CONFIG-STOP
-- ASN1STOP
``` us 12,341,612 B2

PRIORITY DIFFERENTIATION OF SR TRANSMISSIONS WITH HARQ-ACK CODEBOOKS OF DIFFERENT SERVICE TYPES

CROSS REFERENCE

This Nonprovisional application claims priority under 35 U.S.C. § 119 on provisional Application No. 62/878,175 on Jul. 24, 2019, the entire contents of which are hereby incorporated by reference.

TECHNICAL FIELD

The present disclosure generally relates to wireless communication, and more particularly, to priority differentiation of scheduling request (SR) transmissions with hybrid automatic repeat request-acknowledgment (HARQ-ACK) codebooks of different service types.

BACKGROUND ART

In the current 3rd Generation Partnership Project (3GPP) specifications, only one HARQ-ACK codebook per slot is supported. Also, SR priority is not considered at the physical (PHY) layer. As separate HARQ-ACK codebooks may be supported for different service types, and SR priority may be known to the UEs at the PHY layer, there is a need in the art to investigate methods of SR priority differentiation and indication over different HARQ-ACK codebooks to support the new features in the next generation (e.g., fifth generation (5G) new radio (NR)) wireless communication networks.

SUMMARY OF INVENTION

In one example, a user equipment (UE) comprising: when the UE is configured to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, processing circuitry of the UE is configured to append SR information bits to HARQ-ACK information bits using PUCCH format 2 or PUCCH format 3 or PUCCH format 4; and determine a PUCCH to be transmitted based on the priority of the HARQ-ACK information and the states and priorities of the SRs. transmitting circuity of the UE is configured to transmit the selected PUCCH.

In one example, a method by a user equipment (UE), the method comprising: when the UE is configured to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, appending SR information bits to HARQ-ACK information bits using PUCCH format 2 or PUCCH format 3 or PUCCH format 4; and determining a PUCCH to be transmitted based on the priority of the HARQ-ACK information and the states and priorities of the SRs. transmitting the selected PUCCH.

In one example, a gNB comprising: when the gNB configures a UE to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, processing circuitry of the UE is configured to determine a PUCCH is received at a configured PUCCH resources; and receive the uplink control information (UCI) on the PUCCH.

In one example, a method by a gNB, the method comprising: when the gNB configures a UE to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, determining a PUCCH is received at a configured PUCCH resources; and receiving the uplink control information (UCI) on the PUCCH.

BRIEF DESCRIPTION OF DRAWINGS

Implementations of the present technology will now be described, by way of example only, with reference to the attached figures.

FIG. 1 shows a SchedulingRequestResourceConfig information element (IE).

DESCRIPTION OF EMBODIMENTS

Figure 2:
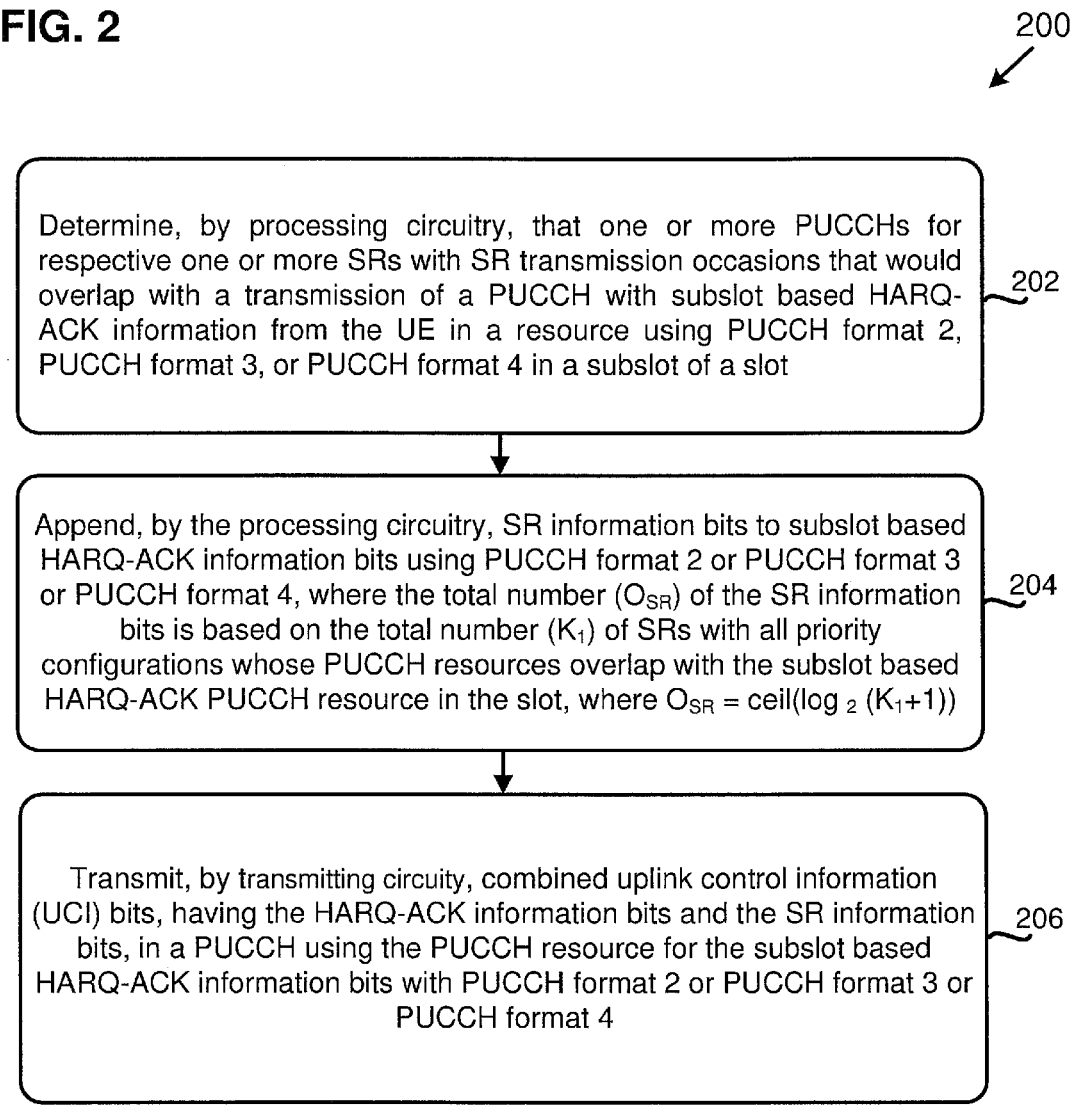
FIG. 2 is a flowchart diagram illustrating a method of a UE for handling subslot based HARQ-ACK and SRs with all priorities without SR priority differentiation by multiplexing, in accordance with example implementations of the present application.

The 3GPP is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and mMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by a same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by DCI. Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

In various implementations of the present application, SR priority may be determined based on periodicity in the number of symbols or time duration. At least two levels of SR priority may be defined, for example, high priority and low priority.

In various implementations of the present application, when a positive SR is multiplexed with other uplink control information (UCI), such as a HARQ-ACK, the SR priority may also be indicated.

In various implementations of the present application, the SR multiplexing behavior may be different for different HARQ-ACK codebooks considering the priorities of both the HARQ-ACK codebook and SR priority.

In various implementations of the present application, the collisions between SR and HARQ-ACK with 2 or more bits on PUCCH format 2 or PUCCH format 3 or PUCCH format 4 are considered.

In various implementations of the present application, different handlings for different HARQ-ACK codebooks and SR priorities are described.

In one implementation, when a PUCCH is configured for subslot based HARQ-ACK codebook with PUCCH format 2 or PUCCH format 3 or PUCCH format 4, a UE may count all SR configurations (e.g., a total number ($K_1$) of SRs with all priority configurations (e.g., high and low priority configurations)), whose PUCCH resources overlap with the subslot based HARQ-ACK PUCCH resource in the slot; append SR information bits (e.g., by multiplexing) to subslot based HARQ-ACK information bits using PUCCH format 2 or PUCCH format 3 or PUCCH format 4, where the number of the SR information bits is obtained by $O_{SR}=\lceil \log_2(K_1+1) \rceil = \text{ceil}(\log_2(K_1+1))$, where ceil(x) or $\lceil x \rceil$ is a ceiling function that returns the smallest integer that is greater or equal to x; and transmit combined uplink control information (UCI) bits, having the HARQ-ACK information bits and the SR information bits, in a PUCCH using the PUCCH resource for the subslot based HARQ-ACK information bits with PUCCH format 2 or PUCCH format 3 or PUCCH format 4.

In one implementation, when a PUCCH is configured for subslot based HARQ-ACK codebook with PUCCH format 2 or PUCCH format 3 or PUCCH format 4, a UE may count only SR with high priority configurations (e.g., a total number ($K_2$) of SRs with high priority configurations, ignoring SR with low priority configurations), whose PUCCH resources overlap with the subslot based HARQ-ACK PUCCH resource in the slot; append SR information bits (e.g., by multiplexing) to subslot based HARQ-ACK information bits using PUCCH format 2 or PUCCH format 3 or PUCCH format 4, where the number of the SR information bits is obtained by $O_{SR}=\text{ceil}(\log_2(K_2+1))$; and transmit combined uplink control information (UCI) bits, having the HARQ-ACK information bits and the SR information bits, in a PUCCH using the PUCCH resource for the subslot based HARQ-ACK information bits with PUCCH format 2 or PUCCH format 3 or PUCCH format 4.

In one implementation, when a PUCCH is configured for slot based HARQ-ACK codebook with PUCCH format 2 or PUCCH format 3 or PUCCH format 4, a UE may determine whether timing and miss detection probability conditions are satisfied. When the timing and miss detection probability conditions are satisfied, the UE may count all SR configurations (e.g., a total number ($K_3$) of SRs with all priority configurations (e.g., high and low priority configurations), whose PUCCH resources overlap with the slot based HARQ-ACK PUCCH resource in the slot; append SR information bits (e.g., by multiplexing) to slot based HARQ-ACK information bits using PUCCH format 2 or PUCCH format 3 or PUCCH format 4, where the number of the SR information bits is obtained by $O_{SR}=\text{ceil}(\log_2(K_3+1))$; and transmit combined uplink control information (UCI) bits, having the HARQ-ACK information bits and the SR information bits, in a PUCCH using the PUCCH resource for the slot based HARQ-ACK information bits with PUCCH format 2 or PUCCH format 3 or PUCCH format 4.

In one implementation, when a PUCCH is configured for slot based HARQ-ACK codebook with PUCCH format 2 or PUCCH format 3 or PUCCH format 4, a UE may determine whether timing and miss detection probability conditions are satisfied. When the timing and miss detection probability conditions are not satisfied, the UE may transmit a PUCCH for a positive SR with high priority, and drop the PUCCH for the slot based HARQ-ACK by puncturing at least overlapping symbols between the PUCCH for the positive SR and the PUCCH for the slot based HARQ-ACK; or transmit the PUCCH for the positive SR with high priority, and not transmit the PUCCH for the slot based HARQ-ACK.

The index of the positive SR with the highest priority is reported. Special handling methods should be defined under some timing constraints or bit error rate (BER) performance criteria.

In one implementation, when a PUCCH is configured for slot based HARQ-ACK codebook with PUCCH format 2 or PUCCH format 3 or PUCCH format 4, a UE may count only SR with low priority configurations (e.g., a total number ($K_4$) of SRs with low priority configurations, ignoring SR with high priority configurations), whose PUCCH resources overlap with the slot based HARQ-ACK PUCCH resource in the slot; append SR information bits (e.g., by multiplexing) to slot based HARQ-ACK information bits using PUCCH format 2 or PUCCH format 3 or PUCCH format 4, where the number of the SR information bits is obtained by $O_{SR}=\text{ceil}(\log_2(K_4+1))$; and transmit combined uplink control information (UCI) bits, having the HARQ-ACK information bits and the SR information bits, in a PUCCH using the PUCCH resource for the slot based HARQ-ACK information bits with PUCCH format 2 or PUCCH format 3 or PUCCH format 4.

The existing UE procedure for SR reporting is described below.

In Subclause 9.2.4 of TS 38.213 in Rel-15 of the 3GPP specification, UE procedure for reporting SR is provided, the content of Subclause 9.2.4 of TS 38.213 in Rel-15 is incorporated by reference in its entirety. A UE is configured by a higher layer parameter, SchedulingRequestResourceConfig, a set of configurations for SR in a PUCCH transmission using either PUCCH format 0 or PUCCH format 1. The UE is configured a PUCCH resource by higher layer parameter SchedulingRequestResourceId providing a PUCCH format 0 resource or a PUCCH format 1 resource as described in Subclause 9.2.1 in TS 38.213. The UE is also configured a periodicity $SR_{PERIODICITY}$ in symbols or slots and an offset $SR_{OFFSET}$ in slots by higher layer parameter periodicityAndOffset for a PUCCH transmission conveying SR. If $SR_{PERIODICITY}$ is larger than one slot, the UE determines SR transmission occasion in a PUCCH to be in a slot with number $n_{s,f}^{\mu}$ [TS 38.211] in a frame with number $n_f$ if $(n_f \cdot N_{slot}^{frame,\mu} + n_{s,f}^{\mu} - SR_{OFFSET}) \bmod SR_{PERIODICITY} = 0$.

If $SR_{PERIODICITY}$ is one slot, the UE expects that $SR_{OFFSET} = 0$ and every slot is SR transmission occasion in a PUCCH.

If $SR_{PERIODICITY}$ is smaller than one slot, the UE determines SR transmission occasion in a PUCCH to start in a symbol with index l [TS 38.211] if $(l-l_0) \bmod SR_{PERIODICITY}) \bmod SR_{PERIODICITY} = 0$ where $l_0$ is the value of higher layer parameter startingSymbolIndex.

If the UE determines that, for SR transmission occasion in a PUCCH, the number of symbols available for the PUCCH transmission in a slot is smaller than the value provided by higher layer parameter nrofSymbols, the UE does not transmit the PUCCH in the slot.

SR transmission occasions in a PUCCH are subject to the limitations for UE transmissions described in Subclause 11.1 and Subclause 11.1.1 of TS 38.213.

The UE transmits a PUCCH in the PUCCH resource for the corresponding SR configuration only when the UE transmits a positive SR. For a positive SR transmission using PUCCH format 0, the UE transmits the PUCCH as described in [TS 38.211] by obtaining $m_0$ as described for HARQ-ACK information in Subclause 9.2.3 of TS 38.213 and by setting $m_{cs}=0$. For a positive SR transmission using PUCCH format 1, the UE transmits the PUCCH as described in [TS 38.211] by setting $b(0)=0$.

In Subclause 9.2.5.1 of TS 38.213 in Rel-15 of the 3GPP specification, UE procedure for multiplexing HARQ-ACK or CSI and SR in a PUCCH is provided, the content of Subclause 9.2.5.1 of TS 38.213 in Rel-15 is incorporated by reference in its entirety. A UE is configured to transmit K PUCCHs for respective K SRs in a slot, as determined by a set of higher layer parameters schedulingRequestResourceId, with SR transmission occasions that would overlap with a transmission of a PUCCH with HARQ-ACK information from the UE in the slot or with a transmission of a PUCCH with periodic/semi persistent CSI transmission from the UE in the slot.

If a UE would transmit a PUCCH with HARQ-ACK information bits in a resource using PUCCH format 2 or PUCCH format 3 or PUCCH format 4 in a slot, as described in Subclause 9.2.3, $\lceil \log_2(K+1) \rceil$ bits representing a negative or positive SR, in ascending order of the values of schedulingRequestResourceId, are appended to the HARQ-ACK information bits, and the UE transmits the combined UCI bits in a PUCCH using a resource with PUCCH format 2 or PUCCH format 3 or PUCCH format 4 for transmission of HARQ-ACK information bits. An all-zero value for the $\lceil \log_2(K+1) \rceil$ bits represents a negative SR value across all K SRs.

If a UE transmits a PUCCH with $O_{ACK}$ HARQ-ACK information bits, $O_{SR} = \lceil \log_2(K+1) \rceil$ SR bits, and $O_{CRC}$ CRC bits using PUCCH format 2 or PUCCH format 3 in a PUCCH resource that includes $M_{RB}^{PUCCH}$ PRBs, the UE determines a number of PRBs $M_{RB,min}^{PUCCH}$ for the PUCCH transmission to be the minimum number of PRBs, that is smaller than or equal to a number of PRBs provided respectively by higher layer parameter nrofPRBs in PUCCH-format2 or nrofPRBs in PUCCH-format3 and starts from the first PRB from the number of PRBs, that results to $(O_{ACK}+O_{SR}+O_{CRC}) \leq M_{RB,min}^{PUCCH} \cdot N_{sc,ctrl}^{RB} \cdot N_{symb-UCI}^{PUCCH} \cdot Q_m \cdot r$ and, if $M_{RB}^{PUCCH} > 1$, $(O_{ACK}+O_{SR}+O_{CRC}) > (M_{RB,min}^{PUCCH}-1) \cdot N_{sc,ctrl}^{RB} \cdot N_{symb-UCI}^{PUCCH} \cdot Q_m \cdot r$, where $N_{sc,ctrl}^{RB}$, $N_{symb-UCI}^{PUCCH}$, $Q_m$, and r are defined in Subclause 9.2.5.2. If $(O_{ACK}+O_{SR}+O_{CRC}) > (M_{RB}^{PUCCH}-1) \cdot N_{sc,ctrl}^{RB} \cdot N_{symb-UCI}^{PUCCH} \cdot Q_m \cdot r$, the UE transmits the PUCCH over the $M_{RB}^{PUCCH}$ PRBs.

In the current 3GPP specification, only one HARQ-ACK codebook is supported per slot. Multiple SR configurations may be configured for a UE. Each SR configuration may be linked to a different traffic type or service. An SR configuration may include an SR PUCCH format and resource, a periodicity and an offset within the periodicity. Since SR only carries one bit, an SR PUCCH resource may be configured with PUCCH format 0 or PUCCH format 1.

For SR multiplexing with HARQ-ACK in a HARQ-ACK resource using the PUCCH format 2 or PUCCH format 3 or PUCCH format 4, all SR status is reported. An all-zero value for the $\lceil \log_2(K+1) \rceil$ bits represents a negative SR value across all K SRs. In case of a positive SR, the index of the positive SR is reported by $\lceil \log_2(K+1) \rceil$ in ascending order of the values of schedulingRequestResourceId. Only one positive SR is reported even if there are multiple positive SRs in the K SR configuration that overlap with the HARQ-ACK PUCCH resource with PUCCH format 2 or PUCCH format 3 or PUCCH format 4.

In the next generation (e.g., 5G NR) wireless communication networks, different service types are supported, (e.g., enhanced mobile broadband (eMBB) and ultra-reliable and low latency (URLLC)). In various implementations of the present application, at least two HARQ-ACK codebooks may be simultaneously constructed for different service types.

For example, Radio Network Temporary Identifier (RNTI) and/or downlink control information (DCI) in downlink (DL) assignment may be used for identifying PDSCHs for different service types (e.g., an eMBB PDSCH and a URLLC PDSCH). In another example, RNTI and/or DCI in DL assignment may be used for identifying HARQ-ACK codebooks for different service types (e.g., a slot level or a slot-based HARQ-ACK codebook for an eMBB PDSCH, a subslot level or sub-slot-based HARQ-ACK codebook for a URLLC service type, etc.).

In various implementations of the present application, prioritization (e.g., lower priority and higher priority) is supported for PUSCH transmission for different service types. For example, RNTI and/or DCI in UL grant may be used for identifying PUSCHs for different service types (e.g., an eMBB PUSCH and a URLLC PUSCH).

In various implementations of the present application, one of the HARQ-ACK codebooks may be slot based HARQ-ACK feedback (e.g., for eMBB services as in Rel-15). Another HARQ-ACK codebook may be intended for low latency feedback with PUCCH resources configured at subslot level.

When at least two HARQ-ACK codebooks are simultaneously constructed for supporting different service types for a UE, all Rel-16 parameters in the PUCCH configuration related to HARQ-ACK feedback may be separately configured for different HARQ-ACK codebooks. The PUCCH resources for slot level HARQ-ACK should be configured at slot level, and the PUCCH resources for subslot level HARQ-ACK should be configured separately in subslot level.

In various implementations of the present application, SR priority is known to the UE at the physical layer.

In Rel-15, there is no priority differentiation for either HARQ-ACK codebook or SR. With separate HARQ-ACK codebooks and known SR priority at the PHY layer, the SR transmission, especially SR multiplexing with other UCI need to be enhanced based on the HARQ-ACK and SR priorities.

In various implementations of the present application, the case(s) of SR multiplexing with HARQ-ACK with 2 or more bits on PUCCH format 2 or PUCCH format 3 or PUCCH format 4 is studied, and new methods to differentiate the SR priority considering different HARQ-ACK codebooks are demonstrated.

In the following, the methods for determining an SR priority are described.

In various implementations of the present application, SR priority may be determined based on the periodicity in the SR resource configuration. FIG. 1 shows a SchedulingRequestResourceConfig information element (IE). The SchedulingRequestResourceConfig IE determines physical layer resources on PUCCH where the UE may send the dedicated scheduling request (D-SR) (see TS 38.213, section 9.2.4).

| SchedulingRequestResourceConfig field descriptions |
| --- |
| periodicityAndOffset |
| SR periodicity and offset in number of slots. Corresponds to L1 parameter 'SR-periodicity' and 'SR-offset' (see 38.213, section 9.2.2). The following periodicities may be configured depending on the chosen subcarrier spacing: |
| SCS = 15 kHz: 2 sym, 7 sym, 1 sl, 2 sl, 4 sl, 5 sl, 8 sl, 10 sl, 16 sl, 20 sl, 40 sl, 80 sl |
| SCS = 30 kHz: 2 sym, 7 sym, 1 sl, 2 sl, 4 sl, 8 sl, 10 sl, 16 sl, 20 sl, 40 sl, 80 sl, 160 sl |
| SCS = 60 kHz: 2 sym, 7 sym/6 sym, 1 sl, 2 sl, 4 sl, 8 sl, 16 sl, 20 sl, 40 sl, 80 sl, 160 sl, 320 sl |
| SCS = 120 kHz: 2 sym, 7 sym, 1 sl, 2 sl, 4 sl, 8 sl, 16 sl, 40 sl, 80 sl, 160 sl, 320 sl, sl640 |
| sym6or7 corresponds to 6 symbols if extended cyclic prefix and a SCS of 60 kHz are configured, otherwise it corresponds to 7 symbols. |
| For periodicities sym2, sym7 and sl1 the UE assumes an offset of 0 slots. |
| resource |
| ID of the PUCCH resource in which the UE shall send the scheduling request. The actual PUCCH-Resource is configured in PUCCH-Config of the same UL BWP and serving cell as this SchedulingRequestResourceConfig. |
| The network configures a PUCCH-Resource of PUCCH-format0 or PUCCH-format1 (other formats not supported). |
| Corresponds to L1 parameter 'SR-resource' (see 38.213, section 9.2.2) |
| schedulingRequestID |
| The ID of the SchedulingRequestConfig that uses this scheduling request resource. |

In one example method according to an implementation of the present application, SR priority may be determined based on the number of symbols. The UE is configured a periodicity $SR_{PERIODICITY}$ in symbols or slots and an offset $SR_{OFFSET}$ in slots by higher layer parameter periodicityAndOffset for a PUCCH transmission conveying SR. A threshold value of a number of symbols can be specified to determine the SR priority. The threshold value may be fixed in the specification. The threshold value may be configured by higher layer signaling (e.g., RRC signaling). A set of values may be configured, and the index of the configured value may be indicated to UE.

For example, if $SR_{PERIODICITY}$ is larger than or equal to one slot, the SR is an SR with low priority. If $SR_{PERIODICITY}$ is smaller than one slot, e.g. 2 symbols, 6 or 7 symbols, the SR is an SR with high priority.

However, for a high sub-carrier spacing (SCS) setting, a PUCCH with one slot or more can still be very short. In such a case, the threshold may be specified/configured depending on each SCS. The UE may determine the threshold value based on the SCS configured for uplink (UL) bandwidth part (BWP) for SR transmission (e.g., a UL BWP where a PUCCH resource configured for SR is configured).

In another example method according to an implementation of the present application, SR priority may be determined based on time duration. For example, the SR priority may be determined based on the PUCCH duration of the SR resource. For example, when the SR periodicity (e.g., $SR_{PERIODICITY}$) is less than or equal to 0.5 ms (Periodicity≤0.5 ms), the SR may be considered as an SR with high priority. In other examples, the periodicity may also be defined based on the number of symbols.

A threshold value of a time duration can be specified to determine the SR priority. In one example, the threshold value may be fixed in the specification. In another example, the threshold value may be configured by higher layer signaling (e.g., RRC signaling). In yet another example, a set of values may be configured, and one or more indices of the corresponding one or more configured values may be indicated to the UE.

For example, if the SR PUCCH duration is greater than 0.5 ms (or 0.25 ms), the SR is an SR with low priority. When the SR periodicity (e.g., $SR_{PERIODICITY}$) is less than or equal to 0.5 ms (or 0.25 ms), the SR may be considered as an SR with high priority. Thus, for different high SCS settings, the number of symbols and slots can be different for an SR to be classified into an SR with high priority. For example, for a SCS of 60 kHz, an SR having a periodicity (e.g., $SR_{PERIODICITY}$) of 1 or 2 slots can still be considered an SR with high priority.

In yet another example method according to an implementation of the present application, SR priority may be indicated by higher layer signaling. For example, an SR priority may be explicitly indicated in an SR configuration. The SR priority may be determined based on the parameters in an SR PUCCH configuration. For example, an SR with high priority may be configured with enhanced PUCCH formats (e.g., more than one RB allocation, high transmit power, multiple sequences or cyclic shifts associated with one SR PUCCH resource).

For SR with low priority, only one resource is configured with a sequence and a cyclic shift. Thus, up to twelve SR resources may be configured within one resource block (RB) with the same sequence and different cyclic shifts. An SR with high priority may be configured with a sequence and a cyclic shift, but multiple cyclic shifts associated with the given cyclic shift may be reserved. For example, the configured cyclic shift plus 3, 6, 9 may be reserved and not assigned to any other SRs or PUCCHs in the same physical resource block (PRB). Thus, up to 3 SR with high priority may be configured in a RB with the same sequence and different cyclic shifts. And, an SR with high priority is essentially configured with multiple cyclic shift resources.

In some implementations of the present application, SR priority may be limited to two general categories (or levels), a first priority or high priority, and a second priority or low priority. Furthermore, multiple levels of priorities within each category may be further specified. For example, for different URLLC services, different SR configurations within the SR with high priority category may be applied.

In the following, the methods of reporting HARQ-ACK and SR are described when at least one PUCCH resource configured for SR overlaps with a PUCCH resource configured for HARQ-ACK with 2 or more bits with PUCCH format 2 or PUCCH format 3 or PUCCH format 4.

In various implementations of the present application, in case of a PUCCH resource for HARQ-ACK overlaps with a PUCCH resource for SR, and when a positive SR is multiplexed with other UCI (e.g., HARQ-ACK), the SR priority may also be indicated. Furthermore, the SR multiplexing behavior may be different for different HARQ-ACK codebooks considering the priorities of both HARQ-ACK codebook and SR priority.

Currently, only slot based HARQ-ACK codebook is supported, extra bits indicating a negative or positive SR among K SR resources that overlap with the HARQ-ACK PUCCH are appended to the HARQ-ACK codebook for joint HARQ-ACK and SR transmission. Various implementations of the present application focus the collision between of PUCCH resource for SR and PUCCH resource for HARQ-ACK with 2 or more bits on PUCCH format 2 or PUCCH format 3 or PUCCH format 4.

With different HARQ-ACK codebooks for different service types, in some implementations, subslot level HARQ-ACK codebooks for low latency services may have higher priorities than slot level HARQ-ACK codebooks. Similarly, in some implementations, an SR with high priority is more important than an SR with low priority. Thus, the handling of SR priority may be jointly considered with the type of HARQ-ACK codebook. In general, the following order may be considered for HARQ-ACK and SR, for the importance or priority from high to low: subslot level HARQ-ACK≥SR with high priority>slot level HARA-ACK≥SR with low priority.

Different handling methods may be used for different combinations of types of HARQ-ACK codebooks and SR priorities, including the type and the number of SR configurations in the UCI multiplexing, and timing restrictions and special handling.

CASE 1: PUCCH Carrying Subslot Based HARQ-ACK Codebook with Format 2/3/4

In various implementations of the present application, a UE is configured to transmit one or more PUCCHs for respective one or more SRs with SR transmission occasions that would overlap with a transmission of a PUCCH with subslot based HARQ-ACK information from the UE in a resource using PUCCH format 2, PUCCH format 3, or PUCCH format 4 in a subslot of a slot.

HARQ-ACK codebooks at subslot level (e.g., high priority HARQ-ACK codebook, HARQ-ACK codebook for URLLC) should have higher priority than HARQ-ACK codebooks at slot level. A PUCCH carrying subslot based HARQ-ACK codebook should be configured at subslot level instead of slot level.

For a subslot based HARQ-ACK codebook on a PUCCH resource configured at subslot level, it can be assumed that the status of all overlapping SRs in the slot, which contains the subslot, is known before the subslot based PUCCH transmission.

FIG. 2 is a flowchart diagram illustrating a method of a UE for handling subslot based HARQ-ACK and SRs with all priorities without SR priority differentiation by multiplexing, in accordance with example implementations of the present application. In the exemplary method shown in FIG. 2, SRs with all priorities can be multiplexed with subslot based HARQ-ACK. In the present implementation, the UE may count all SRs whose PUCCH resources overlap with the subslot based HARQ-ACK PUCCH in the subslot where the HARQ-ACK PUCCH occurs. As shown in FIG. 2, flowchart 200 includes actions 202, 204, and 206.

In action 202, the UE may determine, by processing circuitry, that one or more PUCCHs for respective one or more SRs with SR transmission occasions that would overlap with a transmission of a PUCCH with subslot based HARQ-ACK information (e.g., a subslot based HARQ-ACK PUCCH resource) from the UE in a resource using PUCCH format 2, PUCCH format 3, or PUCCH format 4 in a subslot of a slot.

In action 204, the UE may append, by the processing circuitry, SR information bits to subslot based HARQ-ACK information bits using PUCCH format 2 or PUCCH format 3 or PUCCH format 4, where the total number ($O_{SR}$) of the SR information bits is based on the total number ($K_1$) of SRs with all priority configurations whose PUCCH resources overlap with the subslot based HARQ-ACK PUCCH resource in the slot. For example, the total number ($O_{SR}$) of the SR information bits may be obtained by $O_{SR}=\lceil\log_2(K_1+1)\rceil=\text{ceil}(\log_2(K_1+1))$, where ceil(x) or $\lceil x \rceil$ is a ceiling function that returns the smallest integer that is greater or equal to x. In action 204, the UE may multiplex the SRs with the subslot based HARQ-ACK. In case of at least one positive SR is triggered, an index of a positive SR with the highest priority is reported by the SR information bits. Also, an all-zero value for the number ($O_{SR}$) of the SR information bits represents a negative SR value across all overlapping SRs.

In action 206, the UE may transmit, by transmitting circuitry, combined uplink control information (UCI) bits, having the HARQ-ACK information bits and the SR information bits, in a PUCCH using the PUCCH resource for the subslot based HARQ-ACK information bits with PUCCH format 2 or PUCCH format 3 or PUCCH format 4.

In the present exemplary method, the UE is configured to transmit $K_1$ PUCCHs for respective $K_1$ SRs in a slot, as determined by a set of higher layer parameters schedulingRequestResourceId, with SR transmission occasions that would overlap with a transmission of a PUCCH with subslot based HARQ-ACK information from the UE in a subslot. If a UE would transmit a PUCCH with subslot based HARQ-ACK information bits in a resource using PUCCH format 2 or PUCCH format 3 or PUCCH format 4 in the subslot, $\lceil\log_2(K_1+1)\rceil$ bits representing a negative or positive SR, in ascending order of the values of schedulingRequestResourceId, are appended to the subslot based HARQ-ACK information bits and the UE transmits the combined UCI bits in a PUCCH using a resource with PUCCH format 2 or PUCCH format 3 or PUCCH format 4 for transmission of subslot based HARQ-ACK information bits. The index of the positive SR with the highest priority is reported by the $\lceil\log_2(K_1+1)\rceil$ bits. An all-zero value for the $\lceil\log_2(K_1+1)\rceil$ bits represents a negative SR value across all $K_1$ SRs.

The method shown in FIG. 2 may be preferred for multiplexing SR with subslot based HARQ-ACK with the following advantages. First, it maintains the method in current specification Secondly, there is no performance degradation since the SR with low priority is promoted to the same protection level as subslot based HARQ-ACK and SR with high priority. Thus, with this method, the SR priority is determined by the SR configurations, and is not differentiated during the HARQ-ACK and SR multiplexing.

Figure 3:
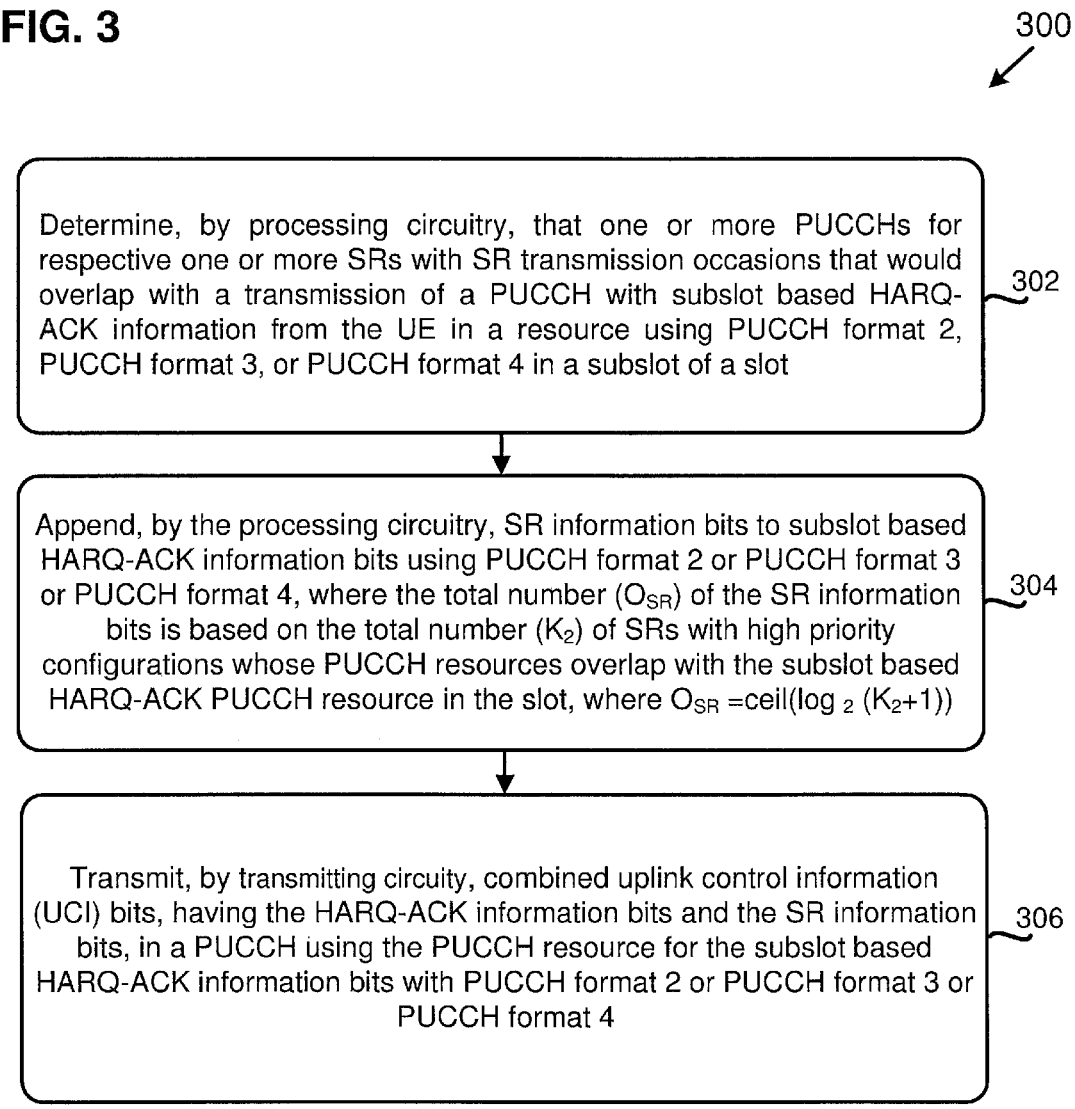
FIG. 3 is a flowchart diagram illustrating a method of a UE for handling subslot based HARQ-ACK and SRs with all priorities with SR differentiation by multiplexing, in accordance with example implementations of the present application.

FIG. 3 is a flowchart diagram illustrating a method of a UE for handling subslot based HARQ-ACK and SRs with all priorities with SR differentiation by multiplexing, in accordance with example implementations of the present application. In the exemplary method shown in FIG. 3, only SRs with high priority can be multiplexed with subslot based HARQ-ACK. In the present implementation, the UE may count SRs with high priority whose PUCCH resources overlap with the subslot based HARQ-ACK PUCCH in the subslot where the HARQ-ACK PUCCH occurs. As shown in FIG. 3, flowchart 300 includes actions 302, 304, and 306.

In action 302, the UE may determine, by processing circuitry, that one or more PUCCHs for respective one or more SRs with SR transmission occasions that would overlap with a transmission of a PUCCH with subslot based HARQ-ACK information from the UE in a resource using PUCCH format 2, PUCCH format 3, or PUCCH format 4 in a subslot of a slot.

In action 304, the UE may append, by the processing circuitry, SR information bits to subslot based HARQ-ACK information bits using PUCCH format 2 or PUCCH format 3 or PUCCH format 4, where the total number ($O_{SR}$) of the SR information bits is based on the total number ($K_2$) of SRs with high priority configurations whose PUCCH resources overlap with the subslot based HARQ-ACK PUCCH resource in the slot. For example, the total number ($O_{SR}$) of the SR information bits may be obtained by $O_{SR}=\text{ceil}(\log_2(K_2+1))=\lceil\log_2(K_2+1)\rceil$. In action 304, the UE may multiplex the SRs with subslot based HARQ-ACKs. In case of at least one positive SR is triggered, an index of a positive SR with the highest priority is reported by the SR information bits. Also, an all-zero value for the number ($O_{SR}$) of the SR information bits represents a negative SR value across all overlapping SRs.

In action 306, the UE may transmit, by transmitting circuitry, combined uplink control information (UCI) bits, having the HARQ-ACK information bits and the SR information bits, in a PUCCH using the PUCCH resource for the subslot based HARQ-ACK information bits with PUCCH format 2 or PUCCH format 3 or PUCCH format 4.

In the present exemplary method, to differentiate the SR priorities, HARQ-ACK and SR multiplexing is performed based on SR priorities. Thus, SRs with low priority are not multiplexed with subslot based HARQ-ACK, and only SRs with high priority are counted in SR payload appended to subslot based HARQ-ACK codebook. In the present exemplary method, $K_2$ is the number of SRs with high priority whose PUCCH resources overlap with the subslot based HARQ-ACK PUCCH transmission, $\lceil\log_2(K_2+1)\rceil$ bits are added to the end of the subslot based HARQ-ACK codebook. The SRs with low priority (e.g., including positive SRs with low priority) are ignored, and not reported together with the subslot based HARQ-ACK codebook. Since the slot level HARQ-ACK codebook is constructed simultaneously, the SRs with low priority can be multiplexed in the slot based HARQ-ACK codebook, there is no need to consider SR with low priority in both slot based and subslot based HARQ-ACK codebook.

In the present exemplary method, the UE is configured to transmit $K_2$ PUCCHs for respective $K_2$ SRs with high priority in a slot, as determined by a set of higher layer parameters schedulingRequestResourceId, with SR transmission occasions that would overlap with a transmission of a PUCCH with subslot based HARQ-ACK information from the UE in a subslot. If a UE would transmit a PUCCH with subslot based HARQ-ACK information bits in a resource using PUCCH format 2 or PUCCH format 3 or PUCCH format 4 in the subslot, $\lceil\log_2(K_2+1)\rceil$ bits representing a negative or positive SR with high priority, in ascending order of the values of schedulingRequestResourceId, are appended to the subslot based HARQ-ACK information bits and the UE transmits the combined UCI bits in a PUCCH using a resource with PUCCH format 2 or PUCCH format 3 or PUCCH format 4 for transmission of subslot based HARQ-ACK information bits. The index of the positive SR with high priority with the highest priority is reported by the $\lceil\log_2(K_2+1)\rceil$ bits. An all-zero value for the $\lceil\log_2(K_2+1)\rceil$ bits represents a negative SR value across all $K_2$ SRs with high priority.

The method shown in FIG. 3, among other advantages, may reduce SR payload size to the HARQ-ACK codebook. Since the method shown in FIG. 3 considers only SRs with high priority, the number of bits representing the status of SR configurations may be smaller than the method shown in FIG. 2, in which SRs with all priorities configurations are counted.

CASE 2: PUCCH Carrying HARQ-ACK Codebook at Slot Level with Format 2/3/4

In various implementations of the present application, a UE is configured to transmit one or more PUCCHs for respective one or more SRs with SR transmission occasions that would overlap with a transmission of a PUCCH with slot based HARQ-ACK information from the UE in a resource using PUCCH format 2, PUCCH format 3, or PUCCH format 4 in a slot.

For example, for HARQ-ACK codebook at slot level (e.g., Rel-15 legacy HARQ-ACK codebook, low priority HARQ-ACK codebook, HARQ-ACK codebook for eMBB, etc.), the PUCCH carrying slot based HARQ-ACK codebook should be configured at slot level.

If all the configured SR PUCCH that overlap with the PUCCH for slot based HARQ-ACK are SRs with low priority, the current method may be sufficient. However, depending on the PUCCH format for the HARQ-ACK feedback, there are many potential issues for multiplexing high priority SR on a slot based HARQ-ACK.

If the slot based HARQ-ACK PUCCH resource is PUCCH format 2, the PUCCH is a short PUCCH with only one or two symbols. The duration of the HARQ-ACK PUCCH is the same as or shorter than the subslot duration. In this case, it can be assumed that the status of all SRs overlap with the HARQ-ACK PUCCH is known.

There are more potential issues if there is at least one SR with high priority in the K SRs that overlap with a slot based HARQ-ACK PUCCH resource configured with long PUCCH formats, such as PUCCH formats 3 and 4. First of all, an SR with high priority may come late, and the SR status is not known when the HARQ-ACK PUCCH transmission starts. Secondly, there may be different positive high priorities SRs in different subslots, the current method can only indicate one SR, some of the SR with high priority will be dropped. Thirdly, the SR with high priority may be time sensitive and requires low latency, if it is multiplexed on slot based HARQ-ACK PUCCH, the delay tolerance may be exceeded.

Furthermore, the bit error rate (BER) or block error rate (BLER) requirements of a slot based HARQ-ACK may be very different from that of an SR with high priority. For example, the target detection error of an eMBB HARQ-ACK or SR with low priority on PUCCH requires $10^{-2}$. But, the target detection error for a URLLC HARQ-ACK or SR with high priority may be $10^{-5}$. In such a case, appending extra bits for SR on a slot based HARQ-ACK PUCCH resource may not be able to provide the desirable performance for SR with high priority.

Thus, if the SR with high priority requires much lower BER, it is more important than the slot level HARQ-ACK, the transmission of a PUCCH for an SR with high priority should have a higher priority than a PUCCH for a slot based HARQ-ACK.

Depending on the PUCCH formats for HARQ-ACK, the SR performance requirement and timing constraints between the PUCCH resource configured for slot based HARQ-ACK and PUCCH resource configured for SR, several approaches can be considered.

Figure 4:
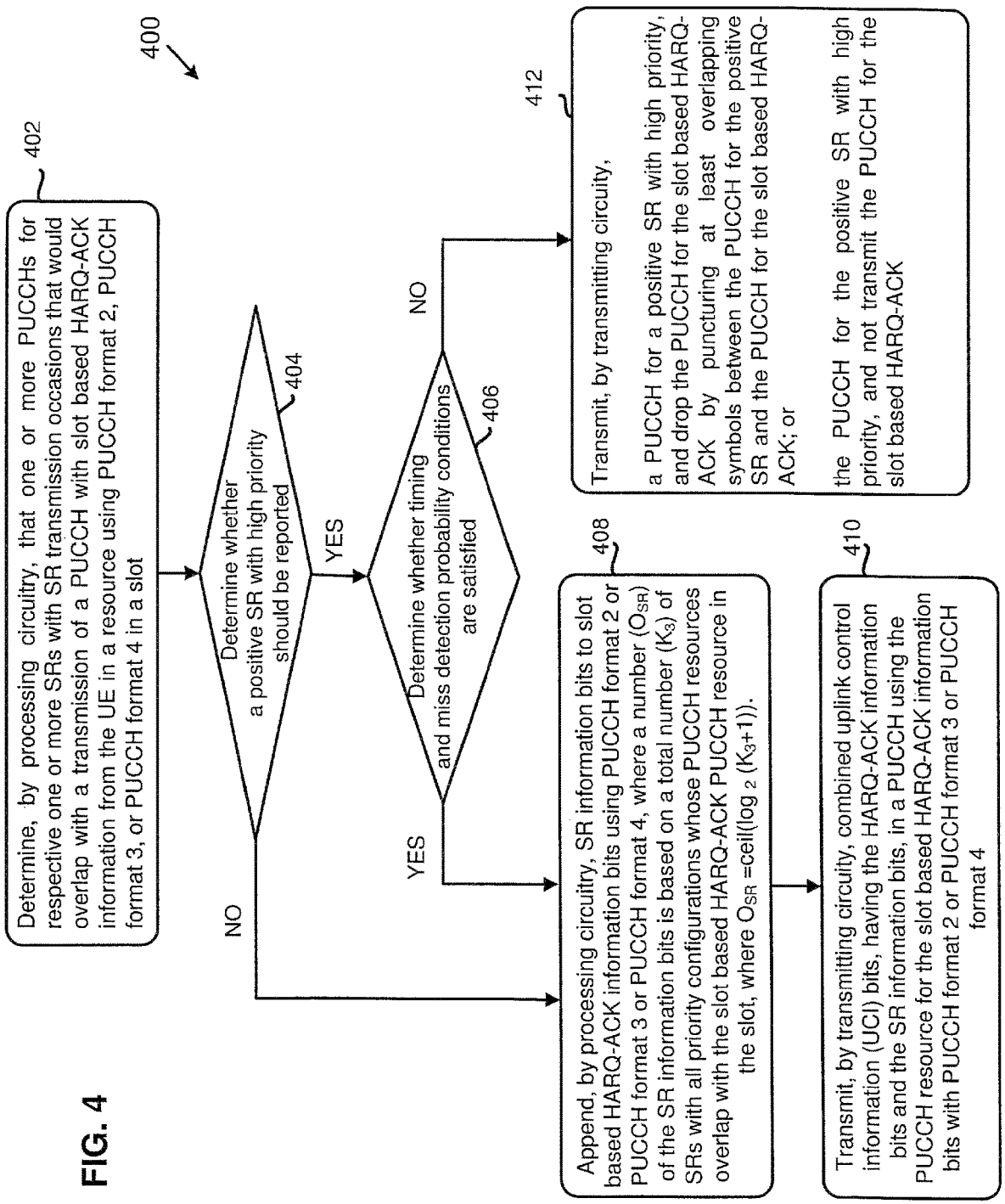
FIG. 4 is a flowchart diagram illustrating a method of a UE for handling slot based HARQ-ACK and SRs with all priorities without SR priority differentiation by multiplexing, in accordance with example implementations of the present application.

FIG. 4 is a flowchart diagram illustrating a method of a UE for handling slot based HARQ-ACK and SRs with all priorities without SR priority differentiation by multiplexing, in accordance with example implementations of the present application. In the exemplary method shown in FIG. 4, SRs with all priorities can be multiplexed with slot based HARQ-ACK. In the present implementation, the UE may count all SRs whose PUCCH resources overlap with the slot based HARQ-ACK PUCCH in the slot where the HARQ-ACK PUCCH occurs. As shown in FIG. 4, flowchart 400 includes actions 402, 404, 406, 408, 410, and 412.

In action 402, the UE may determine, by processing circuitry, that one or more PUCCHs for respective one or more SRs with SR transmission occasions that would overlap with a transmission of a PUCCH with slot based HARQ-ACK information from the UE in a resource using PUCCH format 2 or PUCCH format 3 or PUCCH format 4 in a slot.

In action 404, the UE may determine whether a positive SR with high priority should be reported. For example, the UE may determine whether at least one positive SR with high priority is triggered. If a positive SR with high priority should be reported, in action 406, flowchart 400 may proceed to action 406, where the UE may determine whether timing and miss detection probability conditions are satisfied. If the UE determines that there is no positive SR with high priority to be reported, flowchart 400 may proceed to action 408.

In action 406, the UE may determine whether the timing and miss detection probability conditions are satisfied in case a positive SR with high priority is to be reported. If the UE determines that the timing and miss detection probability conditions are satisfied in action 406, flowchart 400 may proceed to action 408. If the UE determines that the timing and miss detection probability conditions are not satisfied, flowchart 400 may proceed to action 412.

In action 408, the processing circuitry of the UE is configured to append SR information bits to slot based HARQ-ACK information bits using PUCCH format 2 or PUCCH format 3 or PUCCH format 4, where a number ($O_{SR}$) of the SR information bits is based on a total number ($K_3$) of SRs with all priority configurations whose PUCCH resources overlap with the slot based HARQ-ACK PUCCH resource in the slot, where $O_{SR}=\text{ceil}(\log_2(K_3+1))=\lceil \log_2(K_3+1) \rceil$. In action 410, the transmitting circuitry of the UE is configured to transmit combined uplink control information (UCI) bits, having the HARQ-ACK information bits and the SR information bits, in the PUCCH using the PUCCH resource for the slot based HARQ-ACK information bits with PUCCH format 2 or PUCCH format 3 or PUCCH format 4.

If the UE determines that a positive SR with high priority to be reported and the timing and miss detection probability conditions are not satisfied, in action 412, the transmitting circuitry is configured to transmit a PUCCH for a positive SR with high priority, and drop the PUCCH for the slot based HARQ-ACK by puncturing at least overlapping symbols between the PUCCH for the positive SR and the PUCCH for the slot based HARQ-ACK; or transmit the PUCCH for the positive SR with high priority, and not transmit the PUCCH for the slot based HARQ-ACK.

In the present exemplary method, the index of the positive SR with the highest priority is reported by the $\lceil \log_2(K_3+1) \rceil$ bits. An all-zero value for the $\lceil \log_2(K_3+1) \rceil$ bits represents a negative SR value across all K SRs.

In one implementation of the present exemplary method, the timing and miss detection probability conditions are satisfied, for example, when:
(a) a desired miss detection probability of a scheduling request (SR) with high priority is the same as the slot based HARQ-ACK or an SR with low priority;
(b) statuses of all SR configurations are known at the time of transmission of a PUCCH for the slot based HARQ-ACK; and
(c) transmitting a positive SR with high priority with the PUCCH for the slot based HARQ-ACK meets a latency requirement of the positive SR with high priority.

In one implementation of the present exemplary method, the timing and miss detection probability conditions are not satisfied, for example, when:
(a) transmitting a positive SR with high priority with the PUCCH for the slot based HARQ-ACK does not meet the latency requirement of the positive SR with high priority;
(b) a positive SR with high priority arrives after a start of the transmission of the PUCCH for the slot based HARQ-ACK;
(c) the desired miss detection probability of the SR with high priority is much lower than the slot based HARQ-ACK or an SR with low priority; or
(d) the SR with high priority is more important than the slot based HARQ-ACK.

In one implementation, the present exemplary method is acceptable only if the desired miss detection probability of SR with high priority is the same or similar to the slot based HARQ-ACK or SR with low priority.

For PUCCH resource configured for slot based HARQ-ACK with PUCCH format 2, it may be assumed that all SR status are known at the time of transmission of PUCCH for HARQ-ACK. If the PUCCH resource for the slot based HARQ-ACK is configured with PUCCH format 3 or PUCCH format 4, the present exemplary method in FIG. 4 may require some timing constraints especially. That is, the status of all SR configurations with high priority should be known at the time of PUCCH for slot based HARQ-ACK transmission. For example, the PUCCH for a positive SR with high priority starts earlier than or at the same symbol as the PUCCH for slot based HARQ-ACK.

Furthermore, even if the BER performance is acceptable, under certain timing constraints, some special handling techniques are still needed. The status of all SRs is assumed to be known, in general, for the present exemplary method, but the status of an SR with high priority may depend on when the positive SR is triggered. The status of the SR may be further limited by the processing time applied for different service types.

In one implementation, if a positive SR with high priority arrives after the start of the transmission of the PUCCH for slot based HARQ-ACK, the positive SR with high priority cannot be reported together with the HARQ-ACK. In such a case, the PUCCH for the positive SR with high priority is be transmitted, and the PUCCH for HARQ-ACK is punctured by the PUCCH for the positive SR with high priority at least in the overlapping symbols. If there are remaining symbol(s) on the PUCCH for HARQ-ACK transmission, in one approach, the remaining symbol(s) on the PUCCH for HARQ-ACK transmission are also dropped. In another approach, the remaining symbol(s) on the PUCCH for HARQ-ACK transmission are resumed and still transmitted.

In another implementation, even if a positive SR with high priority is multiplexed with the slot based HARQ-ACK, if the end of the PUCCH for HARQ-ACK is too late for a positive SR with high priority, the latency requirement may not be satisfied for an ultra-reliable and low latency traffic. In such a case, the PUCCH for the positive SR with high priority is be transmitted, and the PUCCH for HARQ-ACK is be dropped and not transmitted.

In yet another implementation, if the desired miss detection probability of SR with high priority is much smaller than the slot based HARQ-ACK or SR with low priority, or if the SR with high priority is more important than the slot level HARQ-ACK, the transmission of a PUCCH for a positive SR with high priority has a higher priority than a PUCCH for a slot based HARQ-ACK. Thus, even if SR with all priorities can be multiplexed with the slot based HARQ-ACK, if a positive SR with high priority is triggered, the PUCCH for the positive SR with high priority is transmitted, and the PUCCH for HARQ-ACK multiplexed with SR is dropped or punctured.

Thus, the present exemplary method is to count all SR configurations regardless of priority, multiplex with $\lceil \log_2(K_3+1) \rceil$ bits, where $K_3$ is the number of SR configurations that overlap with the PUCCH for slot based HARQ-ACK with PUCCH format 2 or PUCCH format 3 or PUCCH format 4. The index of the positive SR with the highest priority is reported. An all-zero value for the $\lceil \log_2(K_3+1) \rceil$ bits represents a negative SR value across all $K_3$ SRs. Special handling methods are defined under certain timing constraints or BER performance criteria described.

Figure 5:
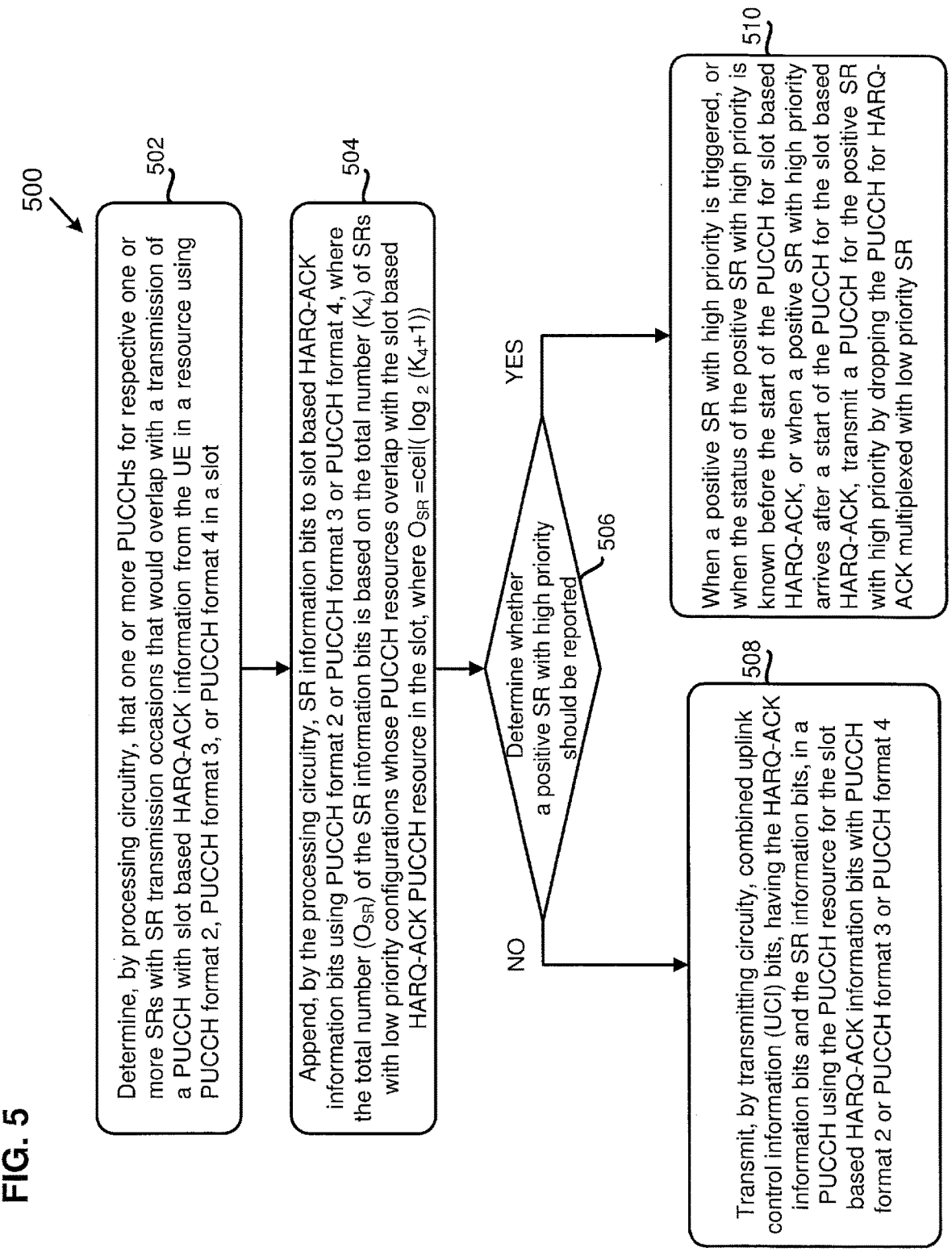
FIG. 5 is a flowchart diagram illustrating a method of a UE for handling slot based HARQ-ACK and SRs with all priorities with SR differentiation by multiplexing, in accordance with example implementations of the present application.

FIG. 5 is a flowchart diagram illustrating a method of a UE for handling slot based HARQ-ACK and SRs with all priorities with SR differentiation by multiplexing, in accordance with example implementations of the present application. In the exemplary method shown in FIG. 5, only SRs with low priority can be multiplexed with slot based HARQ-ACK. Since a PUCCH for a positive SR with high priority should be transmitted in several cases based on timing constraints or BER performance criteria described above with reference to FIG. 4, there is no need to count SRs with high priority into the SR multiplexing on slot based HARQ-ACK in the method shown in FIG. 5. As shown in FIG. 5, flowchart 500 includes actions 502, 504, 506, 508, and 510.

In action 502, the UE may determine, by processing circuitry, that one or more PUCCHs for respective one or more SRs with SR transmission occasions that would overlap with a transmission of a PUCCH with slot based HARQ-ACK information from the UE in a resource using PUCCH format 2, PUCCH format 3, or PUCCH format 4 in a slot.

In action 504, the UE may append, by the processing circuitry, SR information bits to slot based HARQ-ACK information bits using PUCCH format 2 or PUCCH format 3 or PUCCH format 4, where the total number ($O_{SR}$) of the SR information bits is based on the total number ($K_4$) of SRs with low priority configurations whose PUCCH resources overlap with the slot based HARQ-ACK PUCCH resource in the slot. For example, the total number ($O_{SR}$) of the SR information bits may be obtained by $O_{SR}=\text{ceil}(\log_2(K_4+1))=\lceil \log_2(K_4+1) \rceil$. In action 504, the UE may multiplex the SRs with low priority with slot based HARQ-ACKs. An all-zero value for the number ($O_{SR}$) of the SR information bits represents a negative SR value across all overlapping SRs with low priority.

In action 506, the UE may determine whether a positive SR with high priority should be reported. For example, the UE may determine whether at least one positive SR with high priority is triggered. If the UE determines that there is no positive SR with high priority to be reported, flowchart 500 may proceed to action 508, where the UE may transmit, by transmitting circuity, combined uplink control information (UCI) bits, having the HARQ-ACK information bits and the SR information bits, in a PUCCH using the PUCCH resource for the slot based HARQ-ACK information bits with PUCCH format 2 or PUCCH format 3 or PUCCH format 4.

If the UE determines that there is a positive SR with high priority to be reported, flowchart 500 may proceed to action 510, where the UE is configured to transmit a PUCCH for the positive SR with high priority by dropping the PUCCH for HARQ-ACK multiplexed with low priority SR, when a positive SR with high priority is triggered, or when the status of the positive SR with high priority is known before the start of the PUCCH for slot based HARQ-ACK, or when a positive SR with high priority arrives after a start of the PUCCH for the slot based HARQ-ACK.

In the present exemplary method, to differentiate the SR priority, HARQ-ACK and SR multiplexing is performed based on priorities. Thus, SRs with high priority are not multiplexed with slot based HARQ-ACK, and only SRs with low priority are counted in SR payload appended to slot based HARQ-ACK codebook.

The SRs with high priority are not reported together with the slot based HARQ-ACK codebook. Instead, channel dropping based on priority is performed. Thus, if a positive SR with high priority is triggered, the PUCCH for the positive SR with high priority is transmitted, and the PUCCH for HARQ-ACK multiplexed with low priority SR should be dropped or punctured.

In the present exemplary method, the UE is configured to transmit $K_4$ PUCCHs for respective $K_4$ SRs with low priorities in a slot, as determined by a set of higher layer parameters schedulingRequestResourceId, with the SR with low priority transmission occasions that would overlap with a transmission of a PUCCH with slot based HARQ-ACK information from the UE in the slot or with a transmission of a PUCCH with periodic/semi persistent CSI transmission from the UE in the slot.

If the UE would transmit a PUCCH with slot based HARQ-ACK information bits in a resource using PUCCH format 2 or PUCCH format 3 or PUCCH format 4 in a slot, $\lceil \log_2(K_4+1) \rceil$ bits representing a negative or positive SR with low priority, in ascending order of the values of schedulingRequestResourceId, are appended to the HARQ-ACK information bits and the UE transmits the combined UCI bits in a PUCCH using a resource with PUCCH format 2 or PUCCH format 3 or PUCCH format 4 for transmission of HARQ-ACK information bits. An all-zero value for the $\lceil \log_2(K_4+1) \rceil$ bits represents a negative SR value across all $K_4$ SR with low priority.

If the UE would transmit a PUCCH with slot based HARQ-ACK information bits in a resource using PUCCH format 2 or PUCCH format 3 or PUCCH format 4 in a slot, and overlaps with a positive SR with high priority transmission occasion, the UE transmits a PUCCH in the PUCCH resource for the corresponding positive SR with high priority. The PUCCH of positive SR with the highest priority is transmitted if there are multiple positive SRs with high priority or low priority. The PUCCH for the slot level HARQ-ACK is dropped.

If the status of the positive SR with high priority is known before the start of the PUCCH for slot based HARQ-ACK, the PUCCH for the positive SR with the high priority is transmitted, and the PUCCH for the slot level HARQ-ACK is not transmitted. If a positive SR with high priority arrives after the start of the transmission of the PUCCH for slot based HARQ-ACK, the PUCCH for the positive SR with high priority should be transmitted. And the PUCCH for HARQ-ACK should be punctured by the PUCCH for the positive SR with high priority at least in the overlapping symbols. If there are remaining symbol(s) on the PUCCH for HARQ-ACK transmission, in one approach, the remaining symbol(s) on the PUCCH for HARQ-ACK transmission are also dropped. In another approach, the remaining symbol(s) on the PUCCH for HARQ-ACK transmission are resumed and still transmitted.

The present exemplary method is preferred for SR multiplexing with slot base HARQ-ACK. It provides a simple and unified solution to prioritize the transmission of a PUCCH for positive SR with a higher priority than the PUCCH for the slot based HARQ-ACK. Also, the present exemplary method reduces the payload of SR multiplexing on HARQ-ACK since only SRs with low priority are counted.

Thus, the present exemplary method is to, for SR and HARQ-ACK multiplexing, count only SR with low priority configurations, and multiplex with $\lceil \log_2(K_4+1) \rceil$ bits, where $K_4$ is the number of SR with low priority configurations that overlap with the PUCCH for slot based HARQ-ACK with PUCCH format 2 or PUCCH format 3 or PUCCH format 4. For a positive SR with high priority, the PUCCH for the positive SR with high priority is transmitted, and the PUCCH for slot based HARQ-ACK is dropped or punctured.

<Summary>

In one example, a user equipment (UE) comprising: when the UE is configured to transmit one or more physical uplink control channels (PUCCHs) for respective one or more scheduling requests (SRs) with SR transmission occasions that would overlap with a transmission of a PUCCH with subslot based hybrid automatic repeat request-acknowledgment (HARQ-ACK) information from the UE in a resource using PUCCH format 2, PUCCH format 3, or PUCCH format 4 in a subslot of a slot, processing circuitry of the UE is configured to append SR information bits to subslot based HARQ-ACK information bits using PUCCH format 2 or PUCCH format 3 or PUCCH format 4; transmitting circuity of the UE is configured to transmit combined uplink control information (UCI) bits, having the HARQ-ACK information bits and the SR information bits, in a PUCCH using the PUCCH resource for the subslot based HARQ-ACK information bits with PUCCH format 2 or PUCCH format 3 or PUCCH format 4; wherein a number (OSR) of the SR information bits is based on: (1) a total number (K1) of SRs with all priority configurations whose PUCCH resources overlap with the subslot based HARQ-ACK PUCCH resource in the slot, or (2) a total number (K2) of SRs with high priority configurations whose PUCCH resources overlap with the subslot based HARQ-ACK PUCCH resource in the slot.

In one example, the UE, wherein, when the number of SR information bits are based on the SRs with all priority configurations, the processing circuitry is configured to: obtain the number (OSR) of the SR information bits by OSR=ceil(log 2 (K1+1)), where the K1 is the total number of the SRs with all priority configurations whose PUCCH resources overlap with the subslot based HARQ-ACK PUCCH resource in the slot.

In one example, the UE, wherein, when the number of SR information bits is based on only the SRs with high priority configurations, the processing circuitry is configured to: ignore SRs with low priority configurations irrespective of whether the SRs are positive or negative; and obtain the number (OSR) of the SR information bits by OSR=ceil(log 2 (K2+1)), where the K2 is the total number of the SRs with high priority configurations whose PUCCH resources overlap with the subslot based HARQ-ACK PUCCH resource in the slot.

In one example, the UE, wherein an index of a positive SR with the highest priority is reported by the SR information bits, and an all-zero value for the number (OSR) of the SR information bits represents a negative SR value across all overlapping SRs.

In one example, a method by a user equipment (UE), the method comprising: when the UE is configured to transmit one or more physical uplink control channels (PUCCHs) for respective one or more scheduling requests (SRs) with SR transmission occasions that would overlap with a transmission of a PUCCH with subslot based hybrid automatic repeat request-acknowledgment (HARQ-ACK) information from the UE in a resource using PUCCH format 2, PUCCH format 3, or PUCCH format 4 in a subslot of a slot, appending SR information bits to subslot based HARQ-ACK information bits using PUCCH format 2 or PUCCH format 3 or PUCCH format 4; transmitting combined uplink control information (UCI) bits, having the HARQ-ACK information bits and the SR information bits, in a PUCCH using the PUCCH resource for the subslot based HARQ-ACK information bits with PUCCH format 2 or PUCCH format 3 or PUCCH format 4; wherein a number (OSR) of the SR information bits is based on: (1) a total number (K1) of SRs with all priority configurations whose PUCCH resources overlap with the subslot based HARQ-ACK PUCCH resource in the slot, or (2) a total number (K2) of SRs with high priority configurations whose PUCCH resources overlap with the subslot based HARQ-ACK PUCCH resource in the slot.

In one example, the method, wherein, when the number of SR information bits are based on the SRs with all priority configurations, the number (OSR) of the SR information bits is obtained by OSR=ceil(log 2 (K1+1)), where the K1 is the total number of the SRs with all priority configurations whose PUCCH resources overlap with the subslot based HARQ-ACK PUCCH resource in the slot.

In one example, the method, wherein, when the number of SR information bits is based on only the SRs with high priority configurations, the method further comprises: ignoring SRs with low priority configurations irrespective of whether the SRs are positive or negative; and obtaining the number (OSR) of the SR information bits by OSR=ceil(log 2 (K2+1)), where the K2 is the total number of the SRs with high priority configurations whose PUCCH resources overlap with the subslot based HARQ-ACK PUCCH resource in the slot.

In one example, the method, wherein an index of a positive SR with the highest priority is reported by the SR information bits, and an all-zero value for the number (OSR) of the SR information bits represents a negative SR value across all overlapping SRs.

In one example, a user equipment (UE) comprising: when the UE is configured to transmit one or more physical uplink control channels (PUCCHs) for respective one or more scheduling requests (SRs) with SR transmission occasions that would overlap with a transmission of a PUCCH with slot based hybrid automatic repeat request-acknowledgment (HARQ-ACK) information from the UE in a resource using PUCCH format 2 or PUCCH format 3 or PUCCH format 4 in a slot, processing circuitry of the UE is configured to determine whether a positive SR with high priority is to be reported and whether timing and miss detection probability conditions are satisfied; if there is no positive SR with high priority to be reported, or if the timing and miss detection probability conditions are satisfied in case a positive SR with high priority is to be reported, the processing circuitry of the UE is configured to append SR information bits to slot based HARQ-ACK information bits using PUCCH format 2 or PUCCH format 3 or PUCCH format 4; transmitting circuity of the UE is configured to transmit combined uplink control information (UCI) bits, having the HARQ-ACK information bits and the SR information bits, in the PUCCH using the PUCCH resource for the slot based HARQ-ACK information bits with PUCCH format 2 or PUCCH format 3 or PUCCH format 4; wherein a number (OSR) of the SR information bits is based on a total number (K3) of SRs with all priority configurations whose PUCCH resources overlap with the slot based HARQ-ACK PUCCH resource in the slot; if a positive SR with high priority is to be reported and if the timing and miss detection probability conditions are not satisfied, the transmitting circuitry is configured to transmit a PUCCH for a positive SR with high priority, and drop the PUCCH for the slot based HARQ-ACK by puncturing at least overlapping symbols between the PUCCH for the positive SR and the PUCCH for the slot based HARQ-ACK; or transmit the PUCCH for the positive SR with high priority, and not transmit the PUCCH for the slot based HARQ-ACK.

In one example, the UE, wherein the timing and miss detection probability conditions are satisfied if: a desired miss detection probability of a scheduling request (SR) with high priority being the same as the slot based HARQ-ACK or an SR with low priority; statuses of all SR configurations being known at the time of transmission of a PUCCH for the slot based HARQ-ACK; and transmitting a positive SR with high priority with the PUCCH for the slot based HARQ-ACK meeting a latency requirement of the positive SR with high priority.

In one example, the UE, wherein the timing and miss detection probability conditions are not satisfied if: transmitting a positive SR with high priority with the PUCCH for the slot based HARQ-ACK does not meet the latency requirement of the positive SR with high priority; a positive SR with high priority arrives after a start of the transmission of the PUCCH for the slot based HARQ-ACK; the desired miss detection probability of the SR with high priority is smaller than the slot based HARQ-ACK or an SR with low priority; or the SR with high priority is more important than the slot based HARQ-ACK.

In one example, the UE, wherein an index of a positive SR with the highest priority is reported by the SR information bits, and an all-zero value for the number (OSR) of the SR information bits represents a negative SR value across all overlapping SRs.

In one example, the UE, wherein, when the number of SR information bits are based on the SRs with all priority configurations, and the number of the SR information bits (OSR) is obtained by OSR=ceil(log 2 (K3+1)), wherein the K3 is the total number of SRs with all priority configurations whose PUCCH resources overlap with the slot based HARQ-ACK PUCCH resource in the slot.

In one example, a method by a user equipment (UE), the method comprising: when the UE is configured to transmit one or more physical uplink control channels (PUCCHs) for respective one or more scheduling requests (SRs) with SR transmission occasions that would overlap with a transmission of a PUCCH with slot based hybrid automatic repeat request-acknowledgment (HARQ-ACK) information from the UE in a resource using PUCCH format 2 or PUCCH format 3 or PUCCH format 4 in a slot, determining whether a positive SR with high priority is to be reported and whether timing and miss detection probability conditions are satisfied; if there is no positive SR with high priority to be reported, or if the timing and miss detection probability conditions are satisfied in case a positive SR with high priority is to be reported, appending SR information bits to slot based HARQ-ACK information bits using PUCCH format 2 or PUCCH format 3 or PUCCH format 4; transmitting combined uplink control information (UCI) bits, having the HARQ-ACK information bits and the SR information bits, in the PUCCH using the PUCCH resource for the slot based HARQ-ACK information bits with PUCCH format 2 or PUCCH format 3 or PUCCH format 4; wherein a number (OSR) of the SR information bits is based on a total number (K3) of SRs with all priority configurations whose PUCCH resources overlap with the slot based HARQ-ACK PUCCH resource in the slot; if a positive SR with high priority is to be reported and if the timing and miss detection probability conditions are not satisfied, transmitting a PUCCH for a positive SR with high priority, and dropping the PUCCH for the slot based HARQ-ACK by puncturing at least overlapping symbols between the PUCCH for the positive SR and the PUCCH for the slot based HARQ-ACK; or transmitting the PUCCH for the positive SR with high priority, and not transmit the PUCCH for the slot based HARQ-ACK.

In one example, the method, wherein the timing and miss detection probability conditions are satisfied if: a desired miss detection probability of a scheduling request (SR) with high priority being the same as the slot based HARQ-ACK or an SR with low priority; statuses of all SR configurations being known at the time of transmission of a PUCCH for the slot based HARQ-ACK; and transmitting a positive SR with high priority with the PUCCH for the slot based HARQ-ACK meeting a latency requirement of the positive SR with high priority.

In one example, the method, wherein the timing and miss detection probability conditions are not satisfied if: transmitting a positive SR with high priority with the PUCCH for the slot based HARQ-ACK does not meet the latency requirement of the positive SR with high priority; a positive SR with high priority arrives after a start of the transmission of the PUCCH for the slot based HARQ-ACK; the desired miss detection probability of the SR with high priority is smaller than the slot based HARQ-ACK or an SR with low priority; or the SR with high priority is more important than the slot based HARQ-ACK.

In one example, the method, wherein an index of a positive SR with the highest priority is reported by the SR information bits, and an all-zero value for the number (OSR) of the SR information bits represents a negative SR value across all overlapping SRs.

In one example, the method, wherein, when the number of SR information bits are based on the SRs with all priority configurations, and the number of the SR information bits (OSR) is obtained by OSR=ceil(log 2 (K3+1)), wherein the K3 is the total number of SRs with all priority configurations whose PUCCH resources overlap with the slot based HARQ-ACK PUCCH resource in the slot.

In one example, a user equipment (UE) comprising: when the UE is configured to transmit one or more physical uplink control channels (PUCCHs) for respective one or more scheduling requests (SRs) with SR transmission occasions that would overlap with a transmission of a PUCCH with slot based hybrid automatic repeat request-acknowledgment (HARQ-ACK) information from the UE in a resource using PUCCH format 2 or PUCCH format 3 or PUCCH format 4 in a slot, processing circuitry of the UE is configured to append SR information bits to slot based HARQ-ACK information bits using PUCCH format 2 or PUCCH format 3 or PUCCH format 4; transmitting circuitry of the UE is configured to transmit combined uplink control information (UCI) bits, having the HARQ-ACK information bits and the SR information bits, in a PUCCH using the PUCCH resource for the slot based HARQ-ACK information bits with PUCCH format 2 or PUCCH format 3 or PUCCH format 4; wherein a number (OSR) of the SR information bits is based on a total number (K4) of SRs with low priority configurations whose PUCCH resources overlap with the slot based HARQ-ACK PUCCH resource in the slot obtained by OSR=ceil(log 2 (K4+1)).

In one example, the UE, wherein SRs with high priority are not reported with the PUCCH using the PUCCH resource for the slot based HARQ-ACK.

In one example, the UE, wherein, when a positive SR with high priority is triggered in the slot, the transmitting circuity is configured to transmit a PUCCH for the SR with high priority, and drop the PUCCH for the slot based HARQ-ACK.

In one example, the UE, wherein, for a positive SR with high priority whose PUCCH resources overlap with the slot based HARQ-ACK PUCCH resource in the slot, the transmitting circuity is configured to transmit a PUCCH in the PUCCH resource for the positive SR with high priority, and drop the PUCCH for the slot based HARQ-ACK.

In one example, the UE, wherein, if a status of a positive SR with high priority is known before a start of the PUCCH for the slot based HARQ-ACK, the transmitting circuitry is configured to transmit a PUCCH in a PUCCH resource for the positive SR with high priority, and not transmit the PUCCH using the PUCCH resource for the slot based HARQ-ACK.

In one example, the UE, wherein, if a positive SR with high priority arrives after a start of the PUCCH for the slot based HARQ-ACK, the transmitting circuitry is configured to:
 transmit a PUCCH for the positive SR with high priority and drop the PUCCH for the slot based HARQ-ACK by puncturing the PUCCH for the slot based HARQ-ACK in at least overlapping symbols between the PUCCH for the positive SR and the PUCCH for the slot based HARQ-ACK.

In one example, a method by a user equipment (UE), the method comprising: when the UE is configured to transmit one or more physical uplink control channels (PUCCHs) for respective one or more scheduling requests (SRs) with SR transmission occasions that would overlap with a transmission of a PUCCH with slot based hybrid automatic repeat request-acknowledgment (HARQ-ACK) information from the UE in a resource using PUCCH format 2 or PUCCH format 3 or PUCCH format 4 in a slot, appending SR information bits to slot based HARQ-ACK information bits using PUCCH format 2 or PUCCH format 3 or PUCCH format 4; transmitting combined uplink control information (UCI) bits, having the HARQ-ACK information bits and the SR information bits, in a PUCCH using the PUCCH resource for the slot based HARQ-ACK information bits with PUCCH format 2 or PUCCH format 3 or PUCCH format 4; wherein a number (OSR) of the SR information bits is based on a total number (K4) of SRs with low priority configurations whose PUCCH resources overlap with the slot based HARQ-ACK PUCCH resource in the slot obtained by OSR=ceil(log 2 (K4+1)).

In one example, the method, wherein SRs with high priority are not reported with the PUCCH using the PUCCH resource for the slot based HARQ-ACK.

In one example, the method, wherein, when a positive SR with high priority is triggered in the slot, the method further comprises transmitting a PUCCH for the SR with high priority, and dropping the PUCCH for the slot based HARQ-ACK.

In one example, the method, wherein, for a positive SR with high priority whose PUCCH resources overlap with the slot based HARQ-ACK PUCCH resource in the slot, the method further comprises transmitting a PUCCH in the PUCCH resource for the positive SR with high priority, and dropping the PUCCH using the PUCCH resource for the slot based HARQ-ACK.

In one example, the method, wherein, if a status of a positive SR with high priority is known before a start of the PUCCH for the slot based HARQ-ACK, the method further comprises transmitting a PUCCH in a PUCCH resource for the positive SR with high priority, and not transmitting the PUCCH using the PUCCH resource for the slot based HARQ-ACK.

In one example, the method, wherein, if a positive SR with high priority arrives after a start of the PUCCH for the slot based HARQ-ACK, the method further comprises:
 transmitting a PUCCH for the positive SR with high priority and dropping the PUCCH for the slot based HARQ-ACK by puncturing the PUCCH for the slot based HARQ-ACK in at least overlapping symbols between the PUCCH for the positive SR and the PUCCH for the slot based HARQ-ACK.

In one example, a user equipment (UE) comprising: when the UE is configured to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, processing circuitry of the UE is configured to append SR information bits to HARQ-ACK information bits using PUCCH format 2 or PUCCH format 3 or PUCCH format 4; and determine a PUCCH to be transmitted based on the priority of the HARQ-ACK information and the states and priorities of the SRs. transmitting circuity of the UE is configured to transmit the selected PUCCH.

In one example, the UE, wherein, for a PUCCH with a HARQ-ACK information with a given priority, the number of SR information bits is based on only the SRs with the same priority configurations, the processing circuitry is configured to: If the PUCCH is with HARQ-ACK information with high priority, ignore SRs with low priority configurations irrespective of whether the SRs are positive or negative; and obtain the number ($O_{SR}$) of the SR information bits by $O_{SR}=\text{ceil}(\log_2(K_2+1))$, where the $K_2$ is the total number of the SRs with high priority configurations whose PUCCH resources overlap with the high priority HARQ-ACK PUCCH resource in the slot. If the PUCCH is with HARQ-ACK information with low priority, obtain the number ($O_{SR}$) of the SR information bits by $O_{SR}=\text{ceil}(\log_2(K_4+1))$, where the $K_4$ is the total number of the SRs with low priority configurations whose PUCCH resources overlap with the low priority HARQ-ACK PUCCH resource in the slot.

In one example, the UE, wherein an index of a positive SR is reported by the SR information bits, and an all-zero value for the number ($O_{SR}$) of the SR information bits represents a negative SR value across all overlapping SRs.

In one example, the UE, the processing circuitry is configured to determine a PUCCH to be transmitted, wherein if the PUCCH is with HARQ-ACK information with high priority, or if the PUCCH is with HARQ-ACK information with low priority and there is no positive SR with high priority to be reported, the transmitting circuitry is configured to transmit the combined uplink control information (UCI) bits, having the HARQ-ACK information bits and the SR information bits, in a PUCCH using the PUCCH resource for the HARQ-ACK information bits with PUCCH format 2 or PUCCH format 3 or PUCCH format 4; if the PUCCH is with HARQ-ACK information with low priority, and if there is a positive SR with high priority to be reported, the transmitting circuitry is configured to transmit a PUCCH for a positive SR with high priority, and drop the PUCCH for the low priority HARQ-ACK.

In one example, a method by a user equipment (UE), the method comprising: when the UE is configured to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, appending SR information bits to HARQ-ACK information bits using PUCCH format 2 or PUCCH format 3 or PUCCH format 4; and determining a PUCCH to be transmitted based on the priority of the HARQ-ACK information and the states and priorities of the SRs. transmitting the selected PUCCH.

In one example, the method, wherein, for a PUCCH with a HARQ-ACK information with a given priority, the number of SR information bits is based on only the SRs with the same priority configurations, the method further comprises: If the PUCCH is with HARQ-ACK information with high priority, ignoring SRs with low priority configurations irrespective of whether the SRs are positive or negative; and obtaining the number ($O_{SR}$) of the SR information bits by $O_{SR}=\text{ceil}(\log_2(K_2+1))$, where the $K_2$ is the total number of the SRs with high priority configurations whose PUCCH resources overlap with the high priority HARQ-ACK PUCCH resource in the slot. If the PUCCH is with HARQ-ACK information with low priority, obtaining the number ($O_{SR}$) of the SR information bits by $O_{SR}=\text{ceil}(\log_2(K_4+1))$, where the $K_4$ is the total number of the SRs with low priority configurations whose PUCCH resources overlap with the low priority HARQ-ACK PUCCH resource in the slot.

In one example, the method, wherein an index of a positive SR is reported by the SR information bits, and an all-zero value for the number ($O_{SR}$) of the SR information bits represents a negative SR value across all overlapping SRs.

In one example, the method, determining a PUCCH to be transmitted, wherein, if the PUCCH is with HARQ-ACK information with high priority, or if the PUCCH is with HARQ-ACK information with low priority and there is no positive SR with high priority is to be reported, transmitting the combined uplink control information (UCI) bits, having the HARQ-ACK information bits and the SR information bits, in a PUCCH using the PUCCH resource for the HARQ-ACK information bits with PUCCH format 2 or PUCCH format 3 or PUCCH format 4; if the PUCCH is with HARQ-ACK information with low priority, and there is a positive SR with high priority to be reported, transmitting a PUCCH for a positive SR with high priority, and drop the PUCCH for the low priority HARQ-ACK.

In one example, a gNB comprising: when the gNB configures a UE to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, processing circuitry of the UE is configured to determine a PUCCH is received at a configured PUCCH resources; and receive the uplink control information (UCI) on the PUCCH.

In one example, the gNB, wherein, if a PUCCH is received on a PUCCH resource for HARQ-ACK information with PUCCH format 2 or PUCCH format 3 or PUCCH format 4; the gNB receives combined uplink control information (UCI) bits, having the HARQ-ACK information bits and the SR information bits; wherein if the PUCCH resource is for a high priority HARQ-ACK information, a number ($O_{SR}$) of the SR information bits is based on a total number ($K_2$) of SRs with the high priority configurations whose PUCCH resources overlap with the high priority HARQ-ACK PUCCH resource in the slot obtained by $O_{SR}=\text{ceil}(\log_2(K_2+1))$; and if the PUCCH resource is for a low priority HARQ-ACK information, a number ($O_{SR}$) of the SR information bits is based on a total number ($K_4$) of SRs with the low priority configurations whose PUCCH resources overlap with the low priority HARQ-ACK PUCCH resource in the slot obtained by $O_{SR}=\text{ceil}(\log_2(K_4+1))$.

In one example, the gNB, wherein if a PUCCH is received on a PUCCH resource configured for a SR with high priority, the gNB determines a positive SR with high priority is received with the SR index given by the PUCCH resource configuration, and the low priority HARQ-ACK information is dropped.

In one example, a method by a gNB, the method comprising: when the gNB configures a UE to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using PUCCH format 2, PUCCH format 3, or PUCCH format 4, determining a PUCCH is received at a configured PUCCH resources; and receiving the uplink control information (UCI) on the PUCCH.

In one example, the method, wherein, if a PUCCH is received on a PUCCH resource for a HARQ-ACK information with PUCCH format 2 or PUCCH format 3 or PUCCH format 4; the gNB receiving combined uplink control information (UCI) bits, having the HARQ-ACK information bits and the SR information bits; wherein if the PUCCH resource is for a high priority HARQ-ACK information, a number ($O_{SR}$) of the SR information bits is based on a total number ($K_2$) of SRs with the high priority configurations whose PUCCH resources overlap with the high priority HARQ-ACK PUCCH resource in the slot obtained by $O_{SR}$=ceil($\log_2$($K_2$+1)); and if the PUCCH resource is for a low priority HARQ-ACK information, a number ($O_{SR}$) of the SR information bits is based on a total number ($K_4$) of SRs with the low priority configurations whose PUCCH resources overlap with the low priority HARQ-ACK PUCCH resource in the slot obtained by $O_{SR}$=ceil($\log_2$($K_4$+1)).

In one example, the method, wherein if a PUCCH is received on a PUCCH resource configured for a SR with high priority, the gNB determining a positive SR with high priority is received with the SR index given by the PUCCH resource configuration, and the low priority HARQ-ACK information is dropped.

What is claimed is:

1. A user equipment (UE) comprising:
processing circuitry; and
transmitting circuitry, wherein
the transmitting circuitry is configured to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using a PUCCH format 2, or a PUCCH format 3, or a PUCCH format 4,
the processing circuitry is configured to
multiplex uplink control information (UCI) by appending SR information bits to HARQ-ACK information bits on the PUCCH with the HARQ-ACK information, wherein a number of the SR information bits is based on only the one or more PUCCHs for the respective one or more SRs with a same priority as the HARQ-ACK information,
if the PUCCH is with HARQ-ACK information with low priority and there is a positive SR with high priority to be reported, the transmitting circuitry is further configured to transmit a PUCCH for the positive SR with high priority and cancel the transmission of the PUCCH with the HARQ-ACK information with low priority, and
if the PUCCH is with the HARQ-ACK information with low priority and there is no positive SR with high priority to be reported, or if the PUCCH is with HARQ-ACK information with high priority, the transmitting circuitry is further configured to transmit multiplexed UCI bits, having the HARQ-ACK information bits and the SR information bits, in the PUCCH using the resource for the HARQ-ACK information with PUCCH format 2, PUCCH format 3, or PUCCH format 4.

2. A method by a user equipment (UE), the method comprising:
transmitting one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using a PUCCH format 2, or a PUCCH format 3, or a PUCCH format 4;
multiplexing uplink control information (UCI) by appending SR information bits to HARQ-ACK information bits on the PUCCH with the HARQ-ACK information, wherein a number of the SR information bits is based on only the one or more PUCCHs for the respective one or more SRs with a same priority as the HARQ-ACK information;
if the PUCCH is with HARQ-ACK information with low priority and there is a positive SR with high priority to be reported, transmitting a PUCCH for the positive SR with high priority and canceling the transmission of the PUCCH with the HARQ-ACK information with low priority; and
if the PUCCH is with the HARQ-ACK information with low priority and there is no positive SR with high priority to be reported, or if the PUCCH is with HARQ-ACK information with high priority, transmitting multiplexed UCI bits, having the HARQ-ACK information bits and the SR information bits, in the PUCCH using the resource for the HARQ-ACK information with PUCCH format 2, PUCCH format 3, or PUCCH format 4.

3. A next generation node B (gNB) comprising:
processing circuitry; and
receiving circuitry, wherein
the processing circuitry configures a UE to transmit one or more physical uplink control channels (PUCCHs) for respective one or more scheduling requests (SRs) with SR transmission occasions that would overlap with a transmission of a PUCCH with hybrid automatic repeat request-acknowledgment (HARQ-ACK) information from the UE in a resource using a PUCCH format 2, or a PUCCH format 3, or a PUCCH format 4,
the receiving circuitry is configured to receive uplink control information (UCI) multiplexed by appending SR information bits to HARQ-ACK information bits on the PUCCH with the HARQ-ACK information, wherein a number of the SR information bits is based on only the one or more PUCCHs for the respective one or more SRs with a same priority as the HARQ-ACK information,
if the PUCCH is with HARQ-ACK information with low priority and there is a positive SR with high priority to be reported, the receiving circuitry is further configured to receive a PUCCH for the positive SR with high priority and not receive the PUCCH with the HARQ-ACK information with low priority, and
if the PUCCH is with the HARQ-ACK information with low priority and there is no positive SR with high priority to be reported, or if the PUCCH is with HARQ-ACK information with high priority, the receiving circuitry is further configured to receive multiplexed UCI bits, having the HARQ-ACK information bits and the SR information bits, in the PUCCH using the resource for the HARQ-ACK information with PUCCH format 2, PUCCH format 3, or PUCCH format 4.

* * * * *